United States Patent
Walls et al.

(10) Patent No.: US 6,348,933 B1
(45) Date of Patent: *Feb. 19, 2002

(54) SINGLE LOGICAL SCREEN DISPLAY USING MULTIPLE REMOTE COMPUTER SYSTEMS

(75) Inventors: Jeffrey J. Walls; Gregory R. Allen; Derek J. Lukasik, all of Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,107

(22) Filed: Jul. 20, 1998

(51) Int. Cl.$^7$ ................................................ G06F 15/16
(52) U.S. Cl. ...................................... 345/744; 707/203
(58) Field of Search ................................ 345/340, 970, 345/330, 329, 1, 326, 333, 334, 339, 341, 342, 347, 744, 762, 765, 764, 781, 784, 788, 808; 709/203, 301, 302; 707/501, 513, 516

(56) References Cited

U.S. PATENT DOCUMENTS

| | | | |
|---|---|---|---|
| 5,408,600 A | * | 4/1995 | Garfinkel et al. ............ 345/153 |
| 5,408,602 A | * | 4/1995 | Giokas et al. ............... 395/157 |
| 5,594,859 A | * | 1/1997 | Palmer et al. ............... 395/330 |
| 5,727,148 A | * | 3/1998 | Takekawa .............. 395/200.04 |
| 5,748,189 A | * | 5/1998 | Trueblood ................... 345/331 |
| 5,764,230 A | * | 6/1998 | Baradel et al. ............. 345/346 |
| 5,831,609 A | * | 11/1998 | London et al. ............. 345/335 |
| 6,018,340 A | * | 1/2000 | Butler et al. ................ 345/339 |

* cited by examiner

*Primary Examiner*—Cao H. Nguyen
(74) *Attorney, Agent, or Firm*—Kevin M. Hart (57) ABSTRACT

A single logical screen display system includes a client process, a master server process and plural slave server processes. Each of the slave server processes runs on a separate remote computer system. The master server process maintains network connections with the client process and with each of the slave server processes. The client process issues single logical screen window system requests to the master server process. The master server process issues physical screen window system requests to the slave server processes. Each slave server process controls one of a plurality of physical display devices. The plural physical display devices comprise a composite display on which the single logical screen appears.

10 Claims, 8 Drawing Sheets

SINGLE LOGICAL SCREEN DISPLAY USING MULTIPLE REMOTE COMPUTER SYSTEMS

RELATED APPLICATIONS

This application is related to U.S. application Ser. No. 09/119,106, filed Jul. 20, 1998, titled "3D Graphics in a Single Logical Screen Display Using Multiple Remote Computer Systems," and to U.S. Pat. No. 6,215,486, filed Jul. 20, 1998, titled "Event Handling in a Single Logical Screen Display Using Multiple Remote Computer Systems."

FIELD OF THE INVENTION

This invention relates to computer graphics display systems. More particularly, the invention relates to a single logical screen display supported by multiple remote computer systems.

BACKGROUND

Computer graphics displays that have very large sizes and high resolutions are useful in a variety of applications. For example, such displays can be used to create immersive environments in which viewers are surrounded by the display. Such displays are also useful when large amounts of data must be viewable on one large screen, such as in stock market applications, large process control applications and the like. Frequently, in order to provide such a large display with adequately high resolution, a composite screen must be constructed using numerous separate physical display devices such as CRT-type monitors. If the composite screen is to be used interactively, then suitable control mechanisms must also be provided so that objects presented on the composite screen may be moved about and otherwise manipulated freely without regard to the fact that different portions of the objects are actually displayed on different physical display devices. In other words, the different physical display devices comprising the composite screen must be controlled in concert so that they present the illusion of one large logical screen to the viewer. This kind of functionality has become known as "single logical screen" functionality, or simply "SLS." One solution for providing single logical screen functionality in an X Window System environment is taught by Jeffrey J. Walls, Ian A. Elliott and John Marks in U.S. Pat. No. 6,088,005, filed Jan. 10, 1996, titled "A Design and Method for a Large, Physical Workspace" (hereinafter "Walls, et al."), which pattent application is hereby incorporated by reference entirely.

Figure 1:
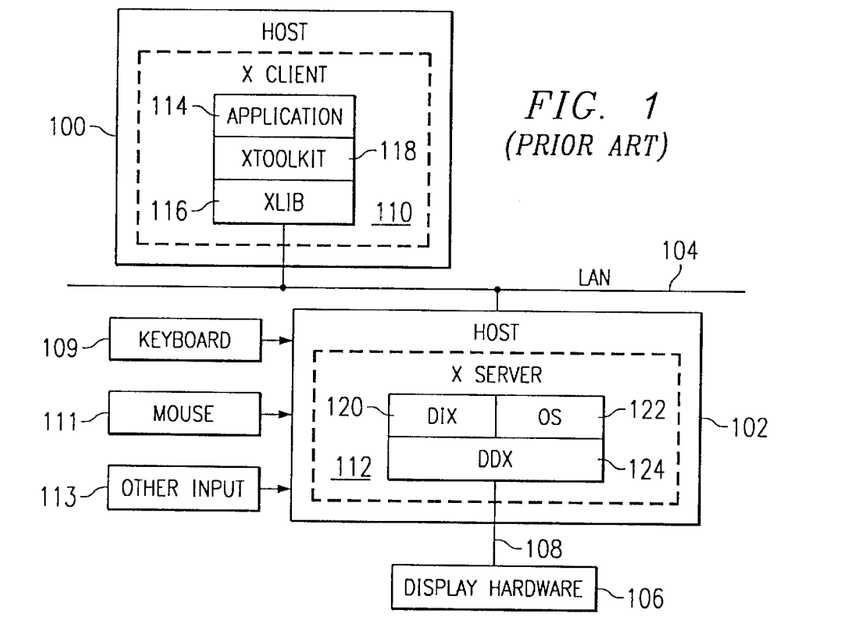
FIG. 1 is a schematic diagram illustrating a single-screen networked X Window System configuration according to the prior art.

By way of background, the X Window System is a standard for implementing window-based user interfaces in a networked computer system. For a more detailed discussion of the X Window System and the X Protocol that defines it, see Adrian Nye, *X Protocol Reference Manual Volume Zero* (O'Reilly & Associates 1990). FIG. 1 illustrates a conventional X Window System configuration that does not implement single logical screen functionality. Host computer system 100 is coupled to host computer system 102 via connections to local area network ("LAN") 104. Host computer system 102 drives display hardware 106 via bus 108 and is capable of receiving input from devices such as a keyboard 109, a mouse 111 or other devices such as a button box 113. X client software 110 runs on host 100, while X server software 112 runs on host 102. Although configurations of client 110 may vary, a typical client would comprise an application 114 that communicates with server 112 by means of calls to low-level library Xlib 116. Optionally, Xlib 116 may be augmented by a higher-level library such as XToolkit 118. The purpose of X server 112 is to implement a user interface on display hardware 106 responsive to commands received from X client 110 and input devices 109, 111 and 113. A conventional X server 112 includes three basic components: a device independent X ("DIX") layer 120, an operating system ("OS") layer 122, and a device dependent X ("DDX") layer 124. DIX layer 120 contains the parts of the server software that are portable from one hardware/OS implementation to another. OS layer 122 implements server functions that vary with specific operating systems. DDX layer 124 implements server functions that depend on the capabilities of particular graphics hardware and input devices. For a more detailed discussion of conventional X server 112, see, Elias Israel and Erik Fortune, *The X Window System Server* (Digital Press 1992) (hereinafter "Israel and Fortune").

Figure 2:
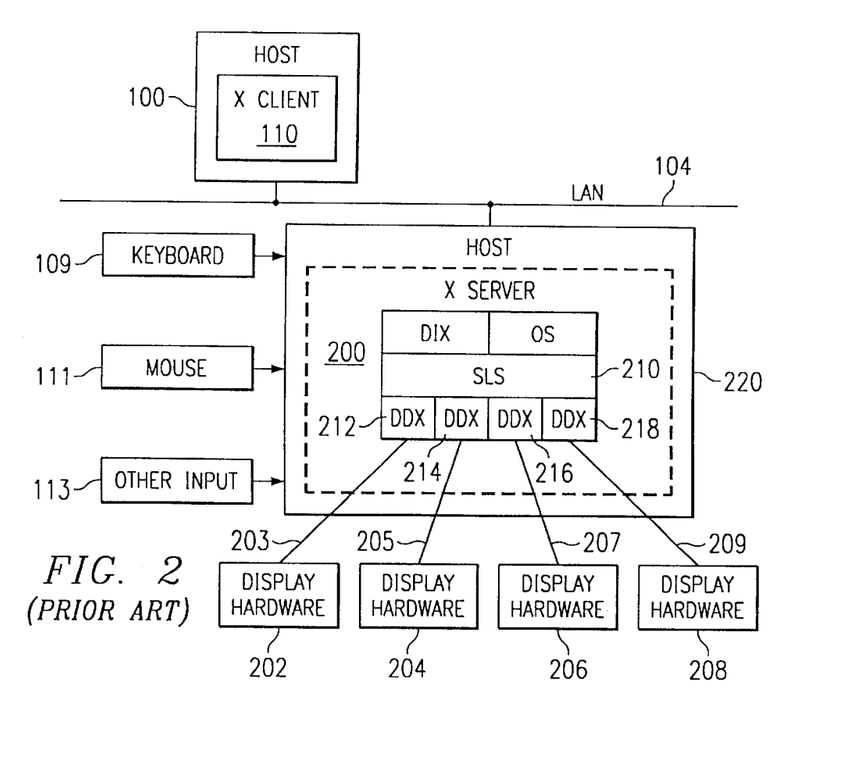
FIG. 2 is a schematic diagram illustrating a single logical screen networked X Window System configuration that uses one remote computer system according to the prior art.

FIG. 2 illustrates an X Window System configuration that implements single logical screen functionality according to the teaching of Walls, et al. In the configuration of FIG. 2, augmented X server software 200 runs on host computer 220. X server 200 controls multiple display hardware devices 202, 204, 208 and 208 via buses 203, 205, 207 and 209. This capability is accomplished by the addition of a single-logical-screen ("SLS") layer 210 to X server 200, as well as a separate DDX layer 212, 214, 216 and 218 for each of the display hardware devices. An advantage of the configuration of FIG. 2 is that single logical screen functionality is provided in a way that is transparent to X Client 110. In other words, the single logical screen functionality provided by X Server 200 enables X Client 110 to function as though it were communicating with one large, high-resolution device. The overhead required to provide the high-resolution single logical screen functionality using several smaller-resolution devices is subsumed entirely within X server 200.

The configuration of FIG. 2 does have limitations, however. One of the challenges associated with implementing a very large single logical screen display is that many physical display devices are required to implement the composite screen. Moreover, each of the physical display devices in the composite screen is usually driven by a separate graphics hardware subsystem. Typically, each such graphics hardware subsystem resides on a graphics circuit card (or cards), which must be installed in a bus socket (or sockets) on the backplane of a host computer system. Unfortunately, there is a physical limit to the number of graphics circuit cards that may be installed into the bus sockets that are provided on a single backplane. While special-purpose backplanes have been built that are capable of receiving as many as nine graphics circuit cards at once, such special-purpose implementations are expensive. The backplanes in more conventional computer systems are only able to receive about four graphics circuit cards for 2D hardware, and fewer than four cards for 3D hardware. (3D graphics circuit cards can require three or more bus slots per card.)

One way of addressing the need for having many graphics circuit cards when attempting to implement a very large single logical screen display would be to use numerous computer systems to support the composite screen. In this manner, numerous backplanes would be provided for receiving the graphics circuit cards (one backplane per computer system). Moreover, each of the computer systems used to support the larger logical screen could be configured like computer system 220 shown in FIG. 2. Unfortunately, the configuration shown in FIG. 2 is only transparent to X client 110 when X server 200 manages the entire logical screen. Therefore, if multiple computer systems 220 were used in order to create a larger logical screen, with each of the computer systems 220 running a separate X server 200, then X client 110 would have to assume a degree of the overhead required to implement the SLS functionality for the larger composite screen.

It is therefore an object of the present invention to provide 2D SLS functionality for very large composite screens in a manner that is transparent to the X client.

It is a further object of the invention to provide such 2D SLS functionality in a manner that enables multiple backplanes to be used for implementing very large composite screens.

SUMMARY OF THE INVENTION

In an exemplary embodiment, the invention provides a single logical screen display system distributed over a network. A client process runs on one host, a master server process runs on another host, and several slave server processes run on slave hosts. The master server process maintains network connections with the client process and with each of the slave server processes. The client process issues single logical screen window system requests to the master server process, and the master server process issues physical screen window system requests to the slave server processes. Each slave server process controls one of a plurality of physical display devices. The plural physical display devices comprise a composite display on which the single logical screen appears.

In a preferred embodiment, the master and slave server processes are modified X servers. The master server process communicates with each of the slave server processes using both X protocol and a new "walX" extension to the X protocol. The walX extension protocol enables DIX/DDX interface functions to be performed over the network between the DIX layer in the master server process and a DDX layer in a slave server process. In the master server process, this ability is provided by a new "WAL" layer that effectively replaces the DDX layer in the master server. The slave server processes are conventional X servers, except that they also support the new walX extension.

The arrangement is unique from a number of perspectives: First, the WAL layer in the master server works in concert with each of the slave servers to present the appearance of a conventional DDX layer to the master's DIX layer. Second, and more specifically, the WAL layer works in concert with the walX extensions in the slave servers so that, at various times, each slave DDX layer may be made to appear to the master server as though the slave DDX layer were the master's missing DDX layer. Third, the WAL layer presents the appearance of a client to each of the slave servers.

A primary benefit provided by the inventive configuration is that, from the point of view of the client process, the master server and slave servers look like a single server that commands a large, high-resolution display. Thus, single logical screen capability is provided in a manner that is "transparent" to the client process. (The client process need not assume any of the overhead associated with controlling plural display hardware devices individually.) Another benefit provided by the inventive configuration is that it overcomes the above-described limitation on the number of graphics cards and monitors that can be used to construct the composite screen. In the inventive configuration, multiple backplanes (one per host computer) may be used to provide the number of bus sockets necessary to create a very large composite screen.

DETAILED DESCRIPTION OF THE PREFERRED EMBODIMENTS

The preferred embodiments of the invention will now be described in detail, first with reference to their architecture and then with reference to their functional behavior.

1 Architecture

Figure 3:
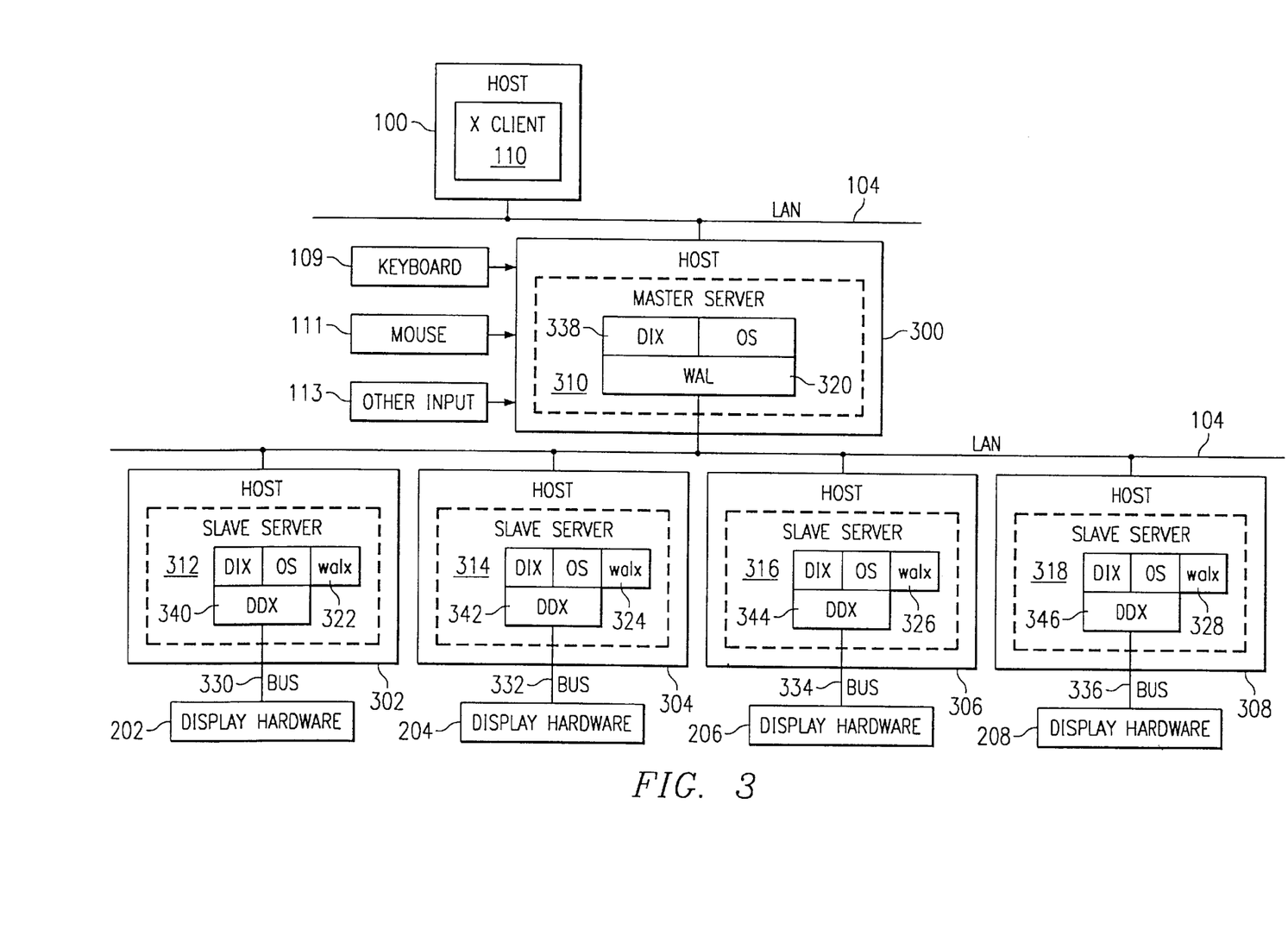
FIG. 3 is a logical schematic diagram illustrating a single logical screen display using multiple remote computer systems according to a preferred embodiment of the invention.
Figure 4:
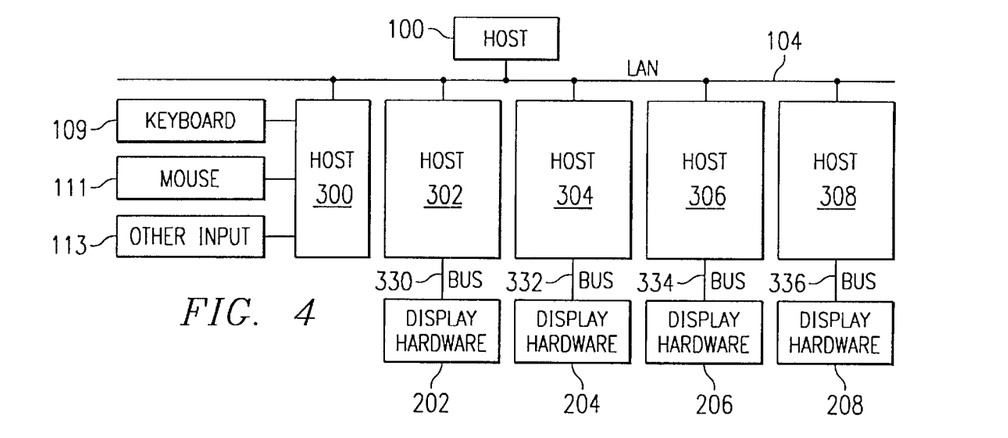
FIG. 4 is a physical schematic diagram of the single logical display of FIG. 3.

FIG. 3 is a logical schematic diagram illustrating a single logical screen display according to a preferred embodiment of the invention. FIG. 4 is a physical schematic diagram illustrating the same single logical screen display system. Host computer system 100 is connected to host computer systems 300–308 via connections to LAN 104. A master X server 310 runs on host 300, while slave X servers 312, 314, 316 and 318 run on hosts 302, 304, 306 and 308, respectively. Master X server 310 differs from conventional X server 112 in that DDX layer 124 is replaced with a new "WAL" layer 320. ("WAL" is an acronym created from the first letter of each of the surnames Walls, Allen and Lukasik.) Slave X servers 312, 314, 316 and 318 differ from conventional X server 112 only in that each slave X server implements a new extension to the X protocol. The new extension is called walX and is shown in the drawings at 322, 324, 326 and 328. Each of display hardware devices 202, 204, 206 and 208 may be conventional and would typically include, for example, a hardware accelerator coupled to a CRT-type monitor. Display hardware devices 202, 204, 206 and 208 are driven by X servers 312, 314, 316 and 318 using buses 330, 332, 334 and 336, respectively.

In a preferred embodiment, the functionality necessary for implementing master server 310 and slave servers 312–318 may be embodied in a single software product, which software product may be distributed using any available computer-readable storage/distribution media such as CDROMs, diskettes, tapes or networks. To create the configuration of FIG. 3, one copy of the software product would preferably be installed in each of hosts 300, 302, 304, 306 and 308. Then, each of the installed copies would be configured to behave either as a master server or a slave server as appropriate.

The arrangement of FIG. 3 is unique from a number of perspectives: First, WAL layer 320 works in concert with each of slave servers 312–318 to present the appearance of a conventional DDX layer to the master's DIX layer 338. Second, and more specifically, WAL layer 320 works in concert with walX extensions 322–328 so that, at various times, each slave DDX layer 340–346 may be made to appear to master 310 as though the slave DDX layer were the master's missing DDX layer. Third, WAL layer 320 presents the appearance of a client to each of slave servers 312–318.

A primary benefit provided by the inventive configuration of FIG. 3 is that, from the point of view of client 110, master server 310 and slave servers 312–318 look like a single server that commands a large, high-resolution display. Thus, single logical screen capability is provided in a manner that is "transparent" to client 110 because client 110 need not assume any of the overhead associated with controlling each of display hardware devices 202–208 individually.

Another benefit provided by the configuration of FIG. 3 is that it overcomes the above-described limitation on the number of graphics cards and monitors that can be used to construct the composite screen. In the configuration of FIG. 3, multiple backplanes (one per host computer) may be used to provide the number of bus sockets necessary to create a very large composite screen.

1.1 Master Server

As mentioned above, master server 310 differs from conventional X server 112 in that a new WAL layer 320 replaces DDX layer 124.

1.1.1 WAL Layer

WAL layer 320 may best be described in terms of the data structures it creates and maintains. Persons having ordinary skill in the art will recognize that, in addition to implementing the routines necessary for creating and maintain those data structures, WAL layer 320 will also have access to a library that will enable WAL layer 320 to make use of walX extensions 322–328. (Such a library would be analogous, for example, to the "client side library" necessary to implement any extension to the X protocol.) The nature of that library will become apparent with reference to the detailed discussion provided below regarding the protocol requests that define the walX extension.

1.1.1.2 WAL Layer Data Structures

In a preferred embodiment, the following data structures are used in WAL layer 320.

WalMasterRec: WalMasterRec is the main data structure created and maintained by WAL layer 320. It may be declared in C as follows:

```
typedef struct __WalMasterRec
{
        Card16                  nRows;
        Card16                  nCols;
        Card16                  nSlaves;
        WalSlavePtr             *pSlaves;
        WalVisualPtr            *pVisualInfo;
        WalCursorInfoPtr        cur;
        Int32                   nCur;
        WalFontInfoPtr          fonl
        Int32                   nFon;
        WalCmapInfoPtr          pCmapInfo;
} WalMasterRec, *WalMasterPtr;
```

One WalMasterRec is maintained for each logical screen desired. Usually, only one logical screen will be desired; thus, usually only one WalMasterRec structure will be maintained. Nevertheless, if more than one logical screen is desired, an array of WalMasterRecs may be declared. The purpose of the WalMasterRec is to define the layout of the slave screens that will comprise the logical screen and to maintain information about each slave. The significance of each field in the WalMasterRec structure is as follows:

The nRows, nColumns and nSlaves fields specify the configuration of the physical display devices that make up the composite screen. For example, nrows=2, nColumns=2 and nSlaves=4 might be used to specify a 2×2 logical screen constructed using 4 CRT-type monitors, each monitor being driven by its own graphics card.

The *pSlaves field is an array of pointers. The pointers point to one WalSlaveRec data structure for each slave server. (The WalSlaveRec structure will be described below.)

The *pVisualInfo field is an array of pointers. The purpose of this array is to provide a mapping from the visuals of the master server to the visuals of each of the slave servers. Preferably, a set of visuals should be determined that is common to all of the slave servers, so that one homogenous set of visuals may be presented to the client.

The cur field is an array of WalCursorInfo recs, one for each cursor. Each of the cursor recs contains an array of pointers to a resource id for that cursor within each slave. The ncur field specifies the current number of cursors.

The font and nFon fields are like the cur and ncur fields in that the font field is an array of WalFontInfo recs, one for each font. Each of the font recs contains an array of pointers to a resource id for that font within each slave. The nFon field specifies the current number of fonts.

The pCmapInfo field is a pointer to the head of a linked list data structure called WalColorMapInfoStruct. In the linked list of the color map info structure, each element has three entries—the master colormap id, the slave color map id, and a pointer to the next element in the list. The purpose of the list is to map slave colormaps to master colormaps.

WalSlaveRec: The WalSlaveRec data structure may be declared in C as follows:

```
typedef struct_WalSlaveRec
{
    Char            *dpyName;
    Display         *dpy;
    Screen          *scr;
    XVisualInfo     *vis;
    Int32           xOffset;
    Int32           yOffset;
    Card32          width;
    Card32          height;
} WalSlaveRec, *WalSLavePtr;
```

One WalSlaveRec data structure is maintained for each slave. The significance of each field in the WalSlaveRec data structure is as follows:

The *dpyName field is the display name field for the slave. The syntax used to name the displays is similar to that used in the X Window System, i.e., "hostname:0." These names identify a display that corresponds to the slave that this data structure is associated with. (The display may in theory be more than one physical monitor screen, but typically would be only one monitor screen.)

The *dpy, *scr and *vis fields are Xlib structures. Specifically, the *dpy field is the result of the XOpenDisplay call. The *vis field is the result of the XListVisualInfo call. And the *scr field is the result of an XScreenOfDisplay call. Note however that, in the configuration of the invention, master server 310 acts as a client for each of slave servers 312–318. Therefore, master server 310 makes these Xlib calls to the slave servers.

The xOffset and yOffset fields are the keys to causing different parts of the same window to appear properly on each of the physical screens in the SLS display. The information in these fields is used to offset every operation in the slave. While window creation uses this information directly, most rendering operations do not need it because the WindowRec structure produced during window creation will be based on the offset. The offset information in the WalSlaveRec structure is used, however, when rendering to the root window.

The width and height fields specify the width and height of the screen for the slave.

Master server 310 also maintains resources for each slave. For each type of resource, and for each slave, the following data structures are used to provide a mapping from the resource id on the master to the resource id on the slave.

WalWindowPrivRec: One of these structures exists for each window in the logical screen. The structure contains a mapping to the window id on each slave corresponding to the window. These structures are appended (as privates) to corresponding WindowRec structures. They may be declared as:

```
typedef struct_WalWindowPrivRec
{
    Window          *pSlave;
} WalWindowPrivRec,
```

WalGCPrivRec: A GC structure exists for each graphics context in master server 310 that was set up by client 110. Each GC structure has one of these structures appended to it (as a private) for the purpose of mapping the GC structure to a corresponding GC structure in each slave. They may be declared as:

```
typedef struct_WalGCPrivRec
{
    xlibGC          *pSlave;
    Int32           fastSlave;
} WalGCPrivRec, *WalGCPrivPtr;
```

The fastSlave field in this data structure is used to identify a slave that entirely contains a drawable on its screen. During the GC validation process, this field is either turned on by setting it to a slave id, or is turned off by setting it to another value. If the field is turned on and the validation is still intact, then draw commands for the pertinent drawable need only be sent to the "fast" slave.

WalPixmapPrivRec: For every pixmap resource on master server 310, this structure provides a mapping to the corresponding resource on each slave. It may be declared as:

```
typedef struct_WalPixmapPrivRec
{
    Pixmap          *pSlave;
} WalPixmapPrivRec, *WalPixmapPrivPtr;
```

WalColormapPrivRec: The nature and use of this data structure is analogous to the nature and use of the above-described WalGCPrivRec structure, except that the WalColormapPrivRec structure is used for colormaps. It may be declared as:

```
typedef struct_WalColormapPrivRec
    Colormap        *pSlave;
} WalCmapPrivRec, *WalCmapPrivPtr;
```

WalVisualStruct: This is the structure pointed to by the *pVisualInfo field of the WalMasterRec. It may be declared as:

```
typedef struct_WalVisualStruct
{
    VisualID        pMaster;
    Visual          **pSlave;
} WalVisualRec, *WalVisualPtr;
```

WalColormapInfoStruct: This is the above-described structure pointed to by the last field in the WalMasterRec structure. It may be declared as:

```
typedef struct_WalColormapInfoStruct
{
    Colormap        pMaster;
    Colormap        pSlave;
    struct_WalColormapInfoStruct *next;
} WalCmapInfoRec, *WalCmapInfoPtr;
```

WalBufferIDStruct: This structure is used during double buffering. There are potentially many back buffers for every window; so, every window that is to be double-buffered would have at least one of these structures associated with it. (The structure always corresponds to the back buffer.) It provides a mapping to corresponding resources in each slave-resources, that is, that correspond to a particular back buffer for a particular window. Preferably, it is a private. It may be declared as:

```
typedef struct_WalBufferIDStruct
{
    XID         pMaster;
    XID         *pSlave;
} WalBufferIDRec, *WalBufferIDPtr;
```

WalCursorInfoStruct: This is the above-described structure pointed to by the cur field of the WalMasterRec structure. It may be declared as:

```
typedef struct_WalCursorInfoStruct
{
    Card32      pMaster;
    XID         *pSlave;
} WalCursorInfoRec, *WalCursorInfoPtr;
```

WalFontInfoStruct: This is the above-described structure pointed to by the fon field of the WalMasterRec structure. It may be declared as:

```
typedef struct_WalFontInfoStruct
{
    Card32      pMaster;
    XFontStruct **pSlave;
} WalFontInfoRec, *WalFontInfoPtr;
```

1.2 Slave Server

As mentioned above, slave servers 312, 314, 316 and 318 differ from conventional X server 112 in that each of these slave servers implements a new extension to the X protocol. The new extension is called walX.

1.2.1 WALX extension

Referring once again to FIG. 1 it can be seen that, in a conventional X Window System implementation, protocol activity occurs only between client 110 and server 112. There is no concept of a master server and a slave server. And the interface between DIX layer 120 and DDX layer 124 within server 112 is a direct one. In other words, routines in DIX layer 120 directly invoke routines in DDX layer 124. (They are part of the same process.) For example, a conventional X server implements functions like Position-Window as a DDX layer routine that is called by the DIX layer in response to the X server receiving a protocol request like MoveWindow from the client. There is no facility in a conventional X server to receive a command like Position-Window as protocol from any higher level entity like a client or another server.

Contrasting the conventional configuration of FIG. 1 with the inventive configuration of FIG. 3, a number of differences become immediately apparent. First, in the configuration of FIG. 3, there are two different types of servers (a master and a slave). Second, there is a LAN connection between master server 310 and slave servers 312–318. Third, as was mentioned above, DIX layer 338 in master server 310 needs to be able to communicate with and invoke routines in DDX layers 340–346 of slave servers 312–318 in order to create a single logical screen display. Therefore, the new walX protocol was developed for two main purposes:

First, it implements a DIX/DDX interface in protocol between DIX layer 338 of master server 310 and DDX layers 340–346 of slave servers 312–318. (In theory, the entire DIX/DDX interface could be implemented in protocol; but, in a preferred embodiment, it was deemed necessary to implement only a subset of the DIX/DDX interface, as will be discussed below.) Second, it implements a number of new requests that do not correspond to preexisting DIX/DDX interface functions.

By way of background, extensions to the X protocol are, in general, server modifications that cause the X server to respond to a protocol that differs from the core X protocol. An extension may augment the core protocol with additional requests, replies, errors or events, or an extension may simply change the behavior of existing requests, replies, errors or events that are defined by the core protocol. It will be understood by those having ordinary skill in the art that, although an extension is implemented by adding functionality to the server, a library that corresponds to the extension must usually be placed on the client side of the LAN connection in order for the client to be able to make use of the functions provided by the extension in the server. In the case of the inventive configuration of FIG. 3, such an extension library would be placed within master server 310 so that it can utilize the functions provided by walX extensions 322–328 within slave servers 312–318. For more detailed information on how extensions to the X protocol are implemented, see Israel and Fortune, supra.

The walX extension defines a number of new protocol requests and replies that will now be discussed in detail. The walX extension does not define any new events or errors. The requests/replies defined by the walX extension can be described in terms of the following functional groups. (Normally, each of the request names in the discussion that follows would be preceded by the letters "walx" in order to identify them as belonging to the extension protocol. The prefix letters have been suppressed in this discussion for simplicity.)

QueryVersion: This request/reply returns the version number of the extension.

SetSlave: This request is used during initialization to tell a target server that it will function as a slave instead of a regular X server. When the target server is told this, the target server enables the walX extension. The new slave server does not need to know where it is in the array of screens that make up the logical display; it just needs to know that it is a slave. The new slave server also sets a new function pointer to change the routine for "deliver events." (Event handling differs in slave servers 312–318 relative to a conventional X server, as will be discussed in detail below.)

Window Requests: WalX implements a number of requests that relate to windows. These functions are analogous to existing DIX/DDX interface functions:

Move, Resize: These requests deal with the x,y location and the width and height of windows. They are similar to routines that exist in the X protocol, but they are pared down for efficiency because, in the inventive configuration of FIG. 3, master 310 knows the information that the X protocol version would normally have to go and figure out.

ReflectStackChange, CirculateWindow: These requests relate to rotating the order of windows in the stacking order.

PaintWindowBorder, ClearToBackground: These requests are painting and filling operations for which functions are not provided in the X protocol.

Rendering Requests: This group of requests includes CreateGC, ValidateGC, CopyClip, DestroyClip, PutImage, CopyArea and CopyPlane. They are analogous to existing DIX/DDX interface functions.

Cursor Requests: This group of requests includes ShowCursor, HideCursor, DisplayCursor, UnrealizeCursor, SetCursorPosition, SetCursorID, GetCursorID, CursorOff, GrabScreen, UngrabScreen and CreateCursor. They are analogous to existing DIX/DDX interface functions.

Colormap Requests: This group of requests includes one request that is analogous to an existing DIX/DDX interface function, and adds two new ones.

ResolveColor is analogous to the existing DIX/DDX interface function.

GetCmapEntryRefCnt: This new request retrieves the current value of the reference count for an individual entry in a particular colormap on a particular slave.

SetCmapEntryRefCnt: This new request sets the value of the reference count for an individual entry in a particular colormap on a particular slave.

Event Requests: This group of requests includes EventAnyPending, EvenGetExpose, EventGetGraphicsExpose, EventGetColormap, and EventFlushColormap. Their purpose will be better understood with reference to the more detailed discussion of event handling provided below in the section titled "Functional Behavior." Briefly, though, in the inventive configuration of FIG. 3, events are cached in each slave server as they occur. (This is to be contrasted with a conventional X Window System configuration, in which events are communicated immediately from the slave to the client as they occur.) Master server 310 periodically polls each slave in order to become aware of events. Master 310 then combines the separate events from each slave into one homogeneous event that would be appropriate for client 110 to receive, and then sends it to client 110.

The EventAnyPending request enables the master to query the slaves individually to determine if any events have occurred in a particular slave. The slaves respond with a mask that indicates occurrences for each type of event. Upon decoding these responses, the master can then issue any of the EventGetExpose, EventGetGraphicsExpose and EventGetColormap requests to the appropriate servers in order to retrieve identified events from those servers. Once a "get" request is issued to the slave, the event is cleared from the event cache on the slave. The EventFlushColormap request is provided because a colormap event on any slave would map to the same colomap within the master; thus, once the colormap event has been retrieved from one slave server, the corresponding colormap events may be "flushed" from the caches on each of the other slave servers, since they would contain no new information as far as the master is concerned.

Miscellaneous Requests: This group of requests includes GetSpans, BitmapToRegion, ModifyPixmapHeader and SetShapeRegion. They are analogous to existing DIX/DDX interface functions.

2 Functional Behavior

To following discussion of functional behavior will provide a better understanding of the preferred methods for using the above-described data structures and protocol extension requests for the purpose of implementing a single logical screen using multiple remote computer systems.

2.1 Slave Management

In addition to creating and maintaining the data structures discussed above, master server 310 communicates with each of slave servers 312–318 in order to perform such operations as resource management, rendering, input processing and event handling. Because each of slave servers 312–318 is a fully functional X server with the additional capabilities of the walX extension, master server 310 may use conventional X protocol as well as WalX protocol when communicating with slave servers 312–318 to accomplish these tasks.

2.1.2 Resource Management

In a preferred embodiment, two different methods may be used for resource management: privates-based resource management and list-based resource management.

2.1.2.1 Privates-Based Resource Management

Figure 5:
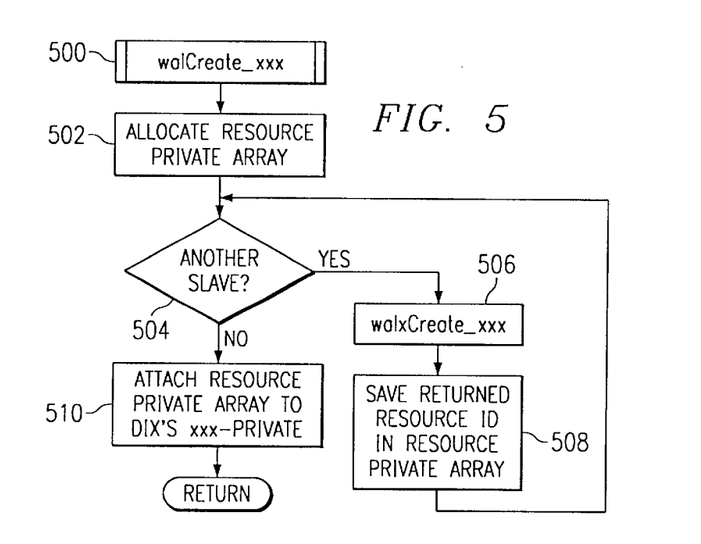
FIG. 5 is a flow diagram illustrating a privates-based method for performing resource management within the master server of FIG. 3.
Figure 6:
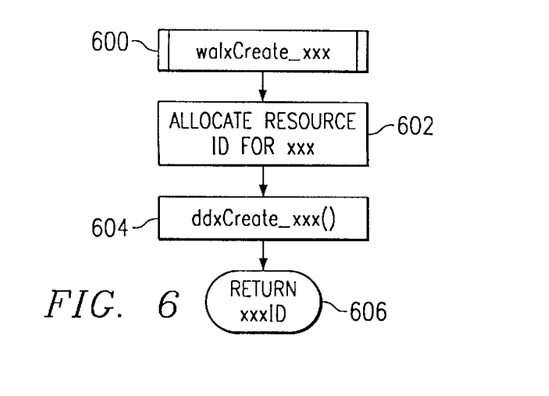
FIG. 6 is a flow diagram illustrating activity that occurs within the slave servers of FIG. 3 responsive to the master server activity depicted in FIG. 5.

FIGS. 5 and 6 illustrate a preferred method for creating resources using privates. FIG. 5 illustrates the method steps that occur within master server 310, and FIG. 6 illustrates the method steps that occur within each of slave servers 312–318. In step 500, master server 310 calls a routine called walCreate_xxx to create a resource. (The three x's are used here in the name of walCreate to mean that the actual command names could differ depending on what type of resource is going to be created.) In step 502, master server 310 allocates a resource private array. Then, in steps 504, 506 and 508, master server 310 loops through each of slave servers 312–318 individually, invoking the walxCreate_xxx protocol request in each case in step 506. In response to the walxCreate_xxx protocol requests, each slave will return a resource ID. In step 508, master server 310 saves the returned resource ID in the resource private array that was allocated during step 502. After this process has been completed for each slave, master server 310 attaches the resource private array to the xxx-private structure belonging to DIX layer 338.

The steps in FIG. 6 illustrate what happens in a slave when master server 310 sends the walxCreate_xxx protocol request in step 506. In step 600, the protocol request is received in the slave. In step 602, the slave server allocates a resource ID for xxx. Then, in step 604, the slave server calls its DDX routine for creating the resource, ddxCreate_xxx( ). Finally, in step 606, the slave returns the xxxID to master server 310.

2.1.2.2 List-Based Resource Management

Figure 7:
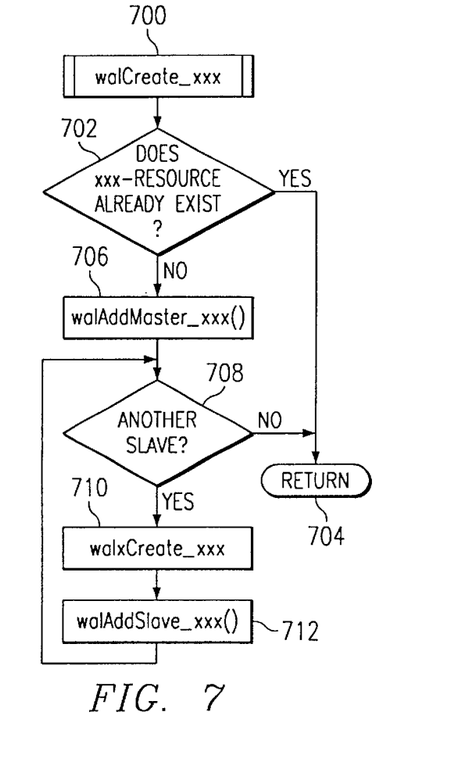
FIG. 7 is a flow diagram illustrating a list-based method for performing resource management within the master server of FIG. 3.

List-based resource management is illustrated in FIG. 7. In step 700, master server 310 calls the waCreate_xxx routine to create the resource. Step 702 checks to see if the resource already exists. If not, then master server 310 invokes a walAddMaster( ) routine in step 706 to add the new resource to its master list. In steps 708, 710 and 712, master server 310 loops through each of the slaves, individually commanding them to create the resource in step 710 and adding the returned resource ID to the master resource list in step 712.

2.1.3 Rendering

Figure 8:
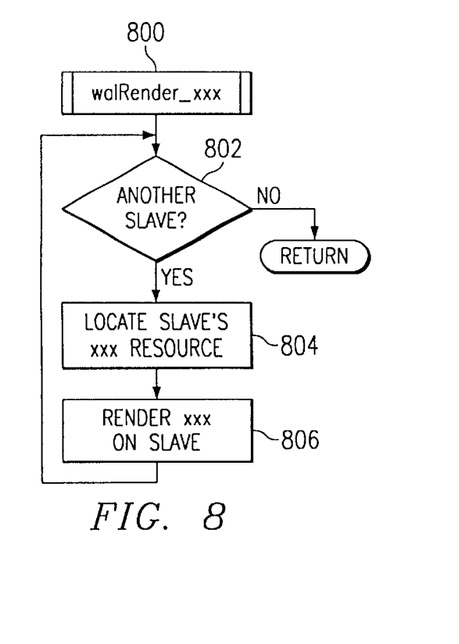
FIG. 8 is a flow diagram illustrating a method for performing rendering operations in the configuration of FIG. 3.

The preferred method for doing rendering operations using the configuration of FIG. 3 is illustrated in FIG. 8. In step 800, master server 310 calls a walRender_xxx routine to draw something. The operation is executed in steps 802, 804 and 806 by having master server 310 loop through each slave and performs steps 804 and 806 on each slave. In step 804, master server 310 locates the slave's xxx resource. In step 806, it performs the rendering operation on the slave using the resource information determined in step 804. Once this has been done for each slave, the operation is complete.

2.1.4 Input Processing

Figure 9:
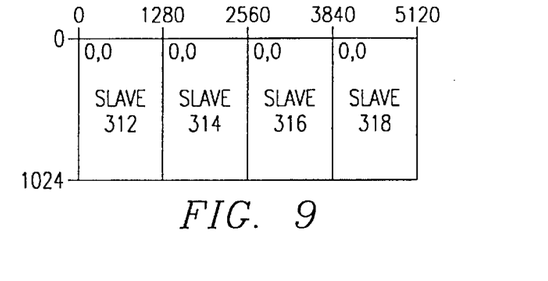
FIG. 9 is a representation of a single logical screen comprised of four physical screens.

The preferred method for doing input processing using the configuration of FIG. 3 may best be explained with a few cursor positioning examples. FIG. 9 illustrates a logical screen composed of four individual screens in a 4×1 configuration. Each of the separate screens corresponds to and is controlled by one of slave servers 312–318, as shown.

Each individual screen has a resolution of 1280×1024; thus, the resolution of the logical screen in this configuration is 5120×1024. Logical screen coordinates range from 0 to 5120 in x and from 0 to 1024 in y. Physical screen coordinates for each screen range from 0 to 1280 in x and from 0 to 1024 in y. The 0,0 origin for the physical coordinate system of each screen is shown in the upper left hand corner of each screen. The xOffset and yOffset information for each screen stored in the WalSlaveRec data structure for each slave is as shown in Table 1.

TABLE 1

| Slave Server | xOffset, yOffset | x'min | x'max | y'min | y'max |
|---|---|---|---|---|---|
| 312 | 0,0 | 0 | 1295 | 0 | 1024 |
| 314 | 1280,0 | −15 | 1295 | 0 | 1024 |
| 316 | 2560,0 | −15 | 1295 | 0 | 1024 |
| 316 | 3840,0 | −15 | 1280 | 0 | 1024 |

Figure 10:
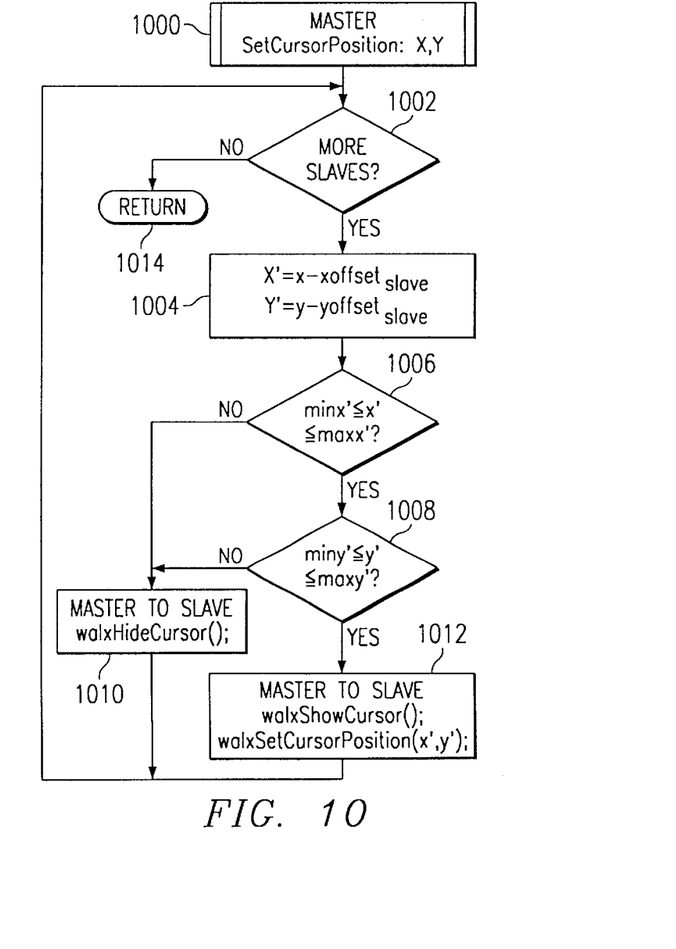
FIG. 10 is a flow diagram illustrating a method for setting a cursor position on the single logical screen of FIG. 9.

Assume that mouse movement has been detected within server 310. Assume further that the appropriate response is to reposition the cursor to logical screen coordinates X,Y. FIG. 10 illustrates the steps that master 310 will perform in order to accomplish this. In steps 1002–1012, master 310 loops through each slave and sends an appropriate request to each slave in order to implement the cursor movement on the logical screen. For each slave, master 310 accesses the WalSlaveRec data structure for that slave in step 1004 and subtracts the xOffset and yOffset stored there from the new logical screen coordinates for the cursor. Then, in steps 1006 and 1008, master 310 compares the post-subtraction cursor coordinates with predetermined minimum and maximum values in x and y for that slave. For example, for the x dimension, a post-subtraction minimum value (x'min) of −15 and a post-subtraction maximum value (x'max) of 1295 might be predetermined in order to provide some overlap between adjacent displays. (x'min for slave 312 and x'max for slave 318 would be 0 and 1280, respectively, because they are at the ends of the logical display.) With a 4×1 screen configuration as shown in the example, appropriate post-subtraction minimum and maximum values for the y dimension (y'min and y'max) would be 0 and 1024; but for configurations containing more than one row of screens, y-dimension overlaps of +/−15 or so may be designated as appropriate to provide overlap. If it is determined in steps 1006 and 1008 that either of the post-subtraction x and y values do not fall within the corresponding predetermined minimum and maximum values for that slave, then master 310 will use protocol to command the slave to hide its cursor in step 1010. Otherwise, master 310 will use protocol to command the slave to show its cursor at the post-subtraction x,y coordinates in step 1012. Once this process has been completed for each slave, the routine returns at step 1014.

Figure 11A:
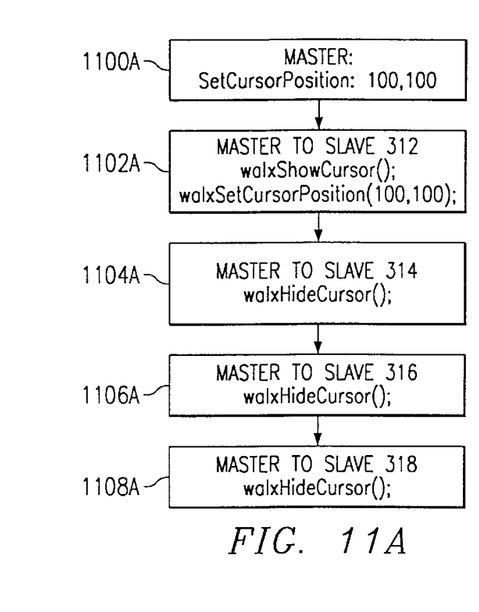
FIGS. 11A–C are flow diagrams illustrating three different cursor positioning examples according to the method of FIG. 10.

FIGS. 11A–C illustrate the results for three different hypothetical cases. In the example of FIG. 11A, at step 1100A, a new cursor position is needed at logical screen coordinates 100,100. Because xOffset and yOffset for slave 312 are 0,0, the result of the subtraction operation for slave 312 yields x'=100, y'=100. These values fall within x'min=0, x'max=1295 and y'min=0, y'max=1024. However, the subtraction operation for each of slaves 314–318 would yield numbers well outside the minimum and maximum ranges for x' and y' for those slaves. Therefore, in step 1102A, master 310 commands slave 312 to show the cursor at 100,100. But in steps 1104A–1108A, master 310 commands slaves 314–318 to hide their cursors.

Figure 11B:
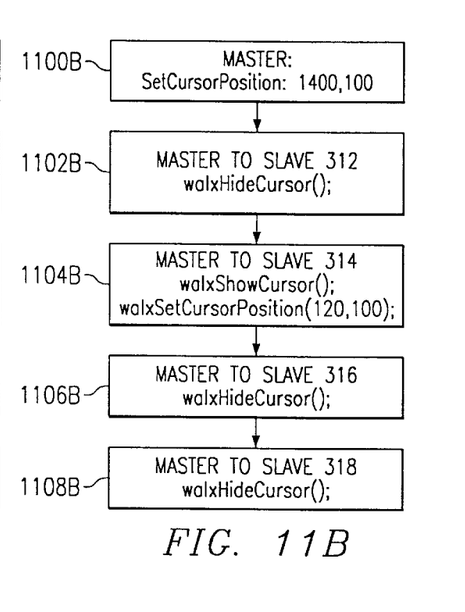

In the example of FIG. 11B, at step 1100B, a new cursor position is needed at logical screen coordinates 1400,100. Because xOffset and yOffset for slave 312 are 0,0, the result of the subtraction operation for slave 312 yields x'=1400, y'=100. The x' value falls outside of the range of x'min and x'max for slave server 312. Therefore, in step 1102B, master 310 commands slave server 312 to hide its cursor. For slave server 314, however, x'=120 and y'=100. These values fall within the min and max ranges for both x' and y' on slave server 314. Therefore, in step 1104B, master 310 commands slave server 314 to show the cursor at 120,100. The subtraction operation for slave servers 316 and 318 yield x' values that do not fall within the x'min and x'max ranges for those servers. Therefore, in steps 1106B and 1108B, master server 310 commands slave servers 316 and 318 to hide their cursors. The result is that the cursor will appear on slave 314's monitor only.

Figure 11C:
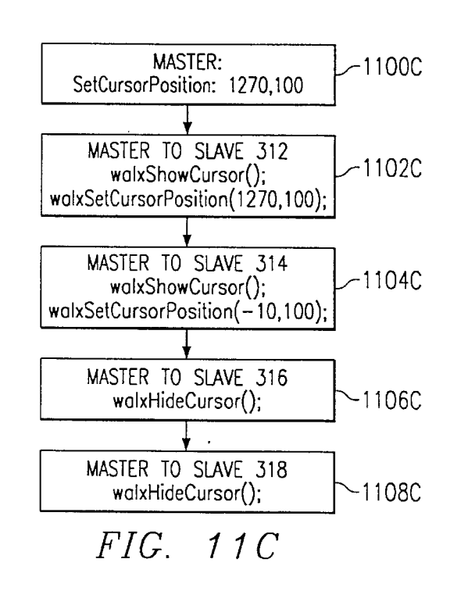

In the example of FIG. 11C, the new cursor position splits the cursor between two monitors. In step 1100C, a new cursor position is needed at logical screen coordinates 1270,100. Assume the cursor width is approximately 20 pixels. This means that the left-most portion of the cursor should appear on the monitor controlled by slave 312, and the right-most portion should appear on the monitor controlled by slave 314. The subtraction operation for slave 312 yields x'=1270, y'=100. These values do fall within the min and max ranges for x' and y' for slave 312. Therefore, in step 1102C, master 310 commands slave 312 to show the cursor at 1270,100. The subtraction operation for slave 314 yields x'=−10, y'=100. These values fall within the min and max ranges for x' and y' for slave 314. Therefore, in step 1104C, master 310 commands slave 314 to show the cursor at −10,100. The subtraction operation for slaves 316 and 318 yield x' values that fall outside the min and max range for x' for those slaves. Therefore, in steps 1106C and 1108C, master server 310 commands slaves 316 and 318 to hide their cursors.

2.2 Special Cases

The inventors solved a number of additional problems uniquely in the process of creating the above-described single logical screen display system. Those solutions are described in the remaining sections.

2.2.1 Event Handling

The preferred technique used for DDX-level event handling in the configuration of FIG. 3 is a unique one and will now be described in more detail with reference to FIGS. 12–15.

Figure 12:
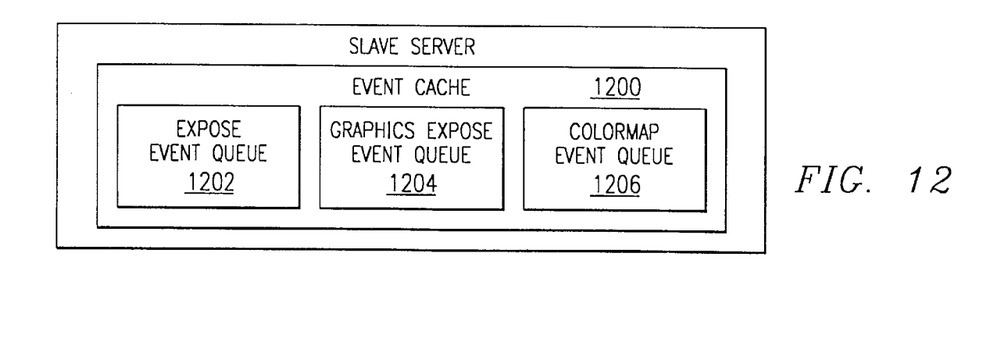
FIG. 12 is a block diagram illustrating an event cache within one of the slave servers of FIG. 3.

As discussed above, when the walxSetSlave command was issued to each of slave servers 312–318, the slave servers installed a new function pointer in their "deliver events" routines such that events would now be stored in memory rather than sent immediately to a client or other entity. FIG. 12 illustrates a preferred storage scheme for implementing this functionality. In each slave server, an event cache 1200 is created. In event cache 1200, one queue structure is created for each type of event that will be of interest. The queue structures may be implemented in any way suitable that will maintain the sequential order of the events within that queue. (For example, a FIFO arrangement may be created for each queue by using RAM memory with appropriate pointers.) In a preferred embodiment, three such queues are created in event cache 1200: an expose event queue 1202, a graphics expose event queue 1204 and a colormap event queue 1206.

To better illustrate how event cache 1200 is used in conjunction with the above-described walx protocol requests that relate to event handling, two examples will now be explored.

2.2.1.1 Expose Events Example

Figure 13:
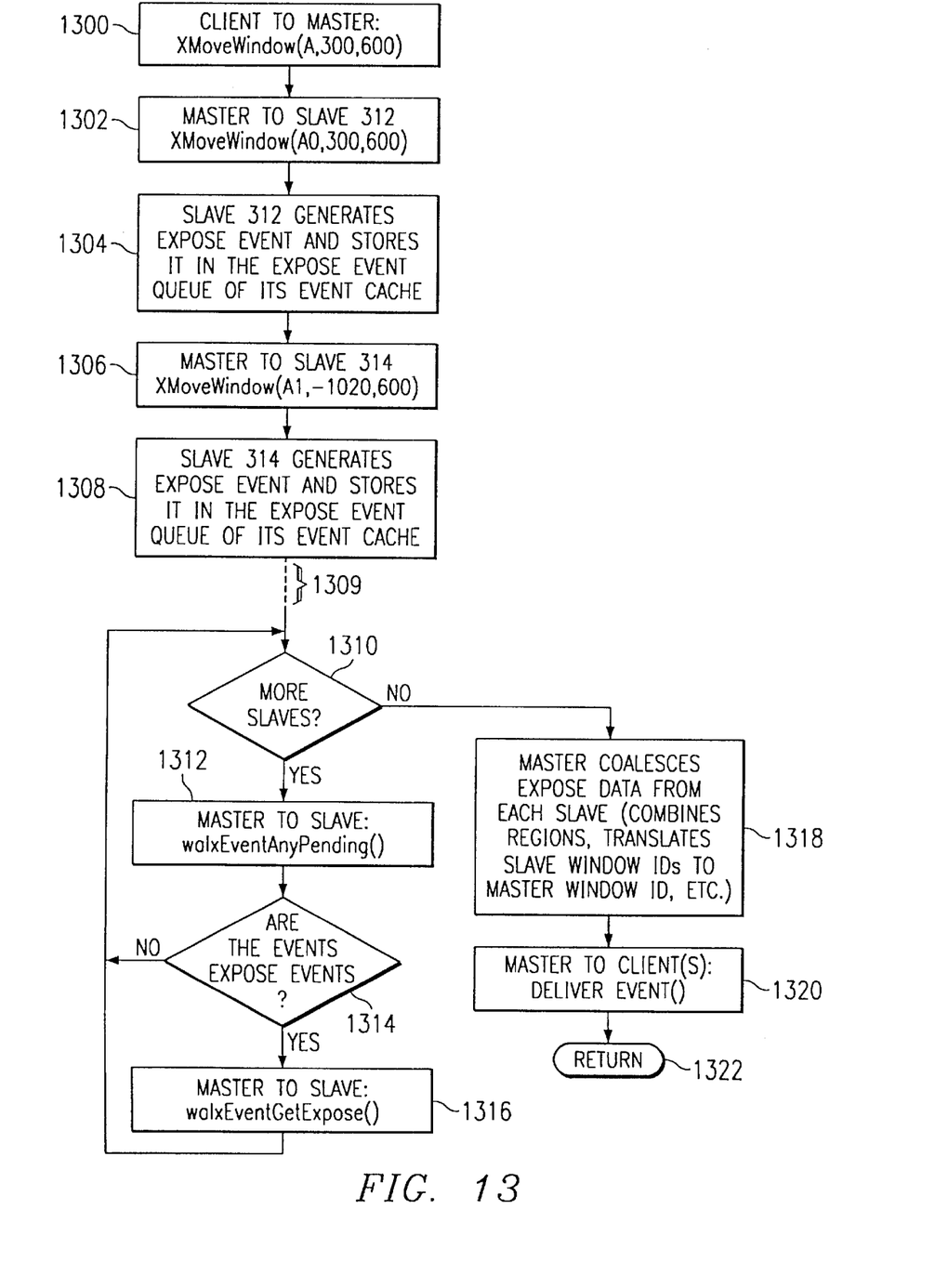
FIG. 13 is a flow diagram illustrating a preferred method for expose event caching and expose event handling within the configuration of FIG. 3.

Referring now to FIG. 13, assume in step 1300 that client 110 asks master 310 to move the window whose master ID is "A." In response to this request, master 310 determines the corresponding window IDs on each slave, as well as the appropriate offsets for each slave, and issues a specially tailored XMoveWindow command to each slave. For example, in step 1302, master 310 issues the command XMoveWindow(A0,300,600) to slave 312, wherein A0 is the window ID on slave 312 that corresponds to the master window ID A, and 300,600 are the offset versions of the coordinates passed from client 110 to master 310. Then, in step 1304, slave 312 will generate an expose event because the window has been moved. Instead of sending the expose event to a client immediately, as would be the case in a conventional X Window System, slave 312 instead stores the expose event in the expose event queue within its event cache.

Similarly, in step 1306, master 310 issues an XMoveWindow(A1,-1020,600) command to slave 314, wherein A1 is the window ID on slave 314 that corresponds to the master window ID A, and -1020,600 are the offset versions of the coordinates passed from client 110 to master 310. Then, in step 1308, slave 314 generates an expose event because the window has been moved. It stores the expose event in the expose event queue within its event cache. The ellipsis shown in the drawing at 1309 indicates that this procedure will be repeated for each slave in the logical screen arrangement. Once this has been done for each slave, master 310 will then poll the slaves to collect the events from each of them.

This polling method is represented by steps 1310–1320 in the drawing. For each slave, master 310 issues a walxEvenAnyPending( ) request in step 1312. The slave will respond to master 310 with a mask. In the example embodiment shown, the mask will be a three-bit field with one bit indicating whether or not the slave has any expose events in its cache, another bit indicating the existence of any graphics expose events, and the third bit indicating the existence of any colormap events. In step 1314, master 310 parses this mask to see if the expose event bit is set. If not, then execution resumes with step 1310. Otherwise, master 310 issues a walxEvenGetExpose( ) request to the slave in step 1316. In response, the slave sends to the master all of the information necessary to define all of the expose events in its queue. (This operation also has the effect of clearing the expose events queue within that slave.)

Once all of the slaves have been polled in this manner, in step 1318 master 310 coalesces the information it has received from the slaves. For example, the regions specified in each slave event must be combined, and any window IDs specified by the slaves must be translated to a master window ID. Once this has been done, in step 1320 master 310 delivers the coalesced event to the client (including any other interested clients).

The method for handling graphics expose events is analogous to the just-described method for handling expose events.

2.2.1.2 Colormap Events Example

Figures 14, 15:
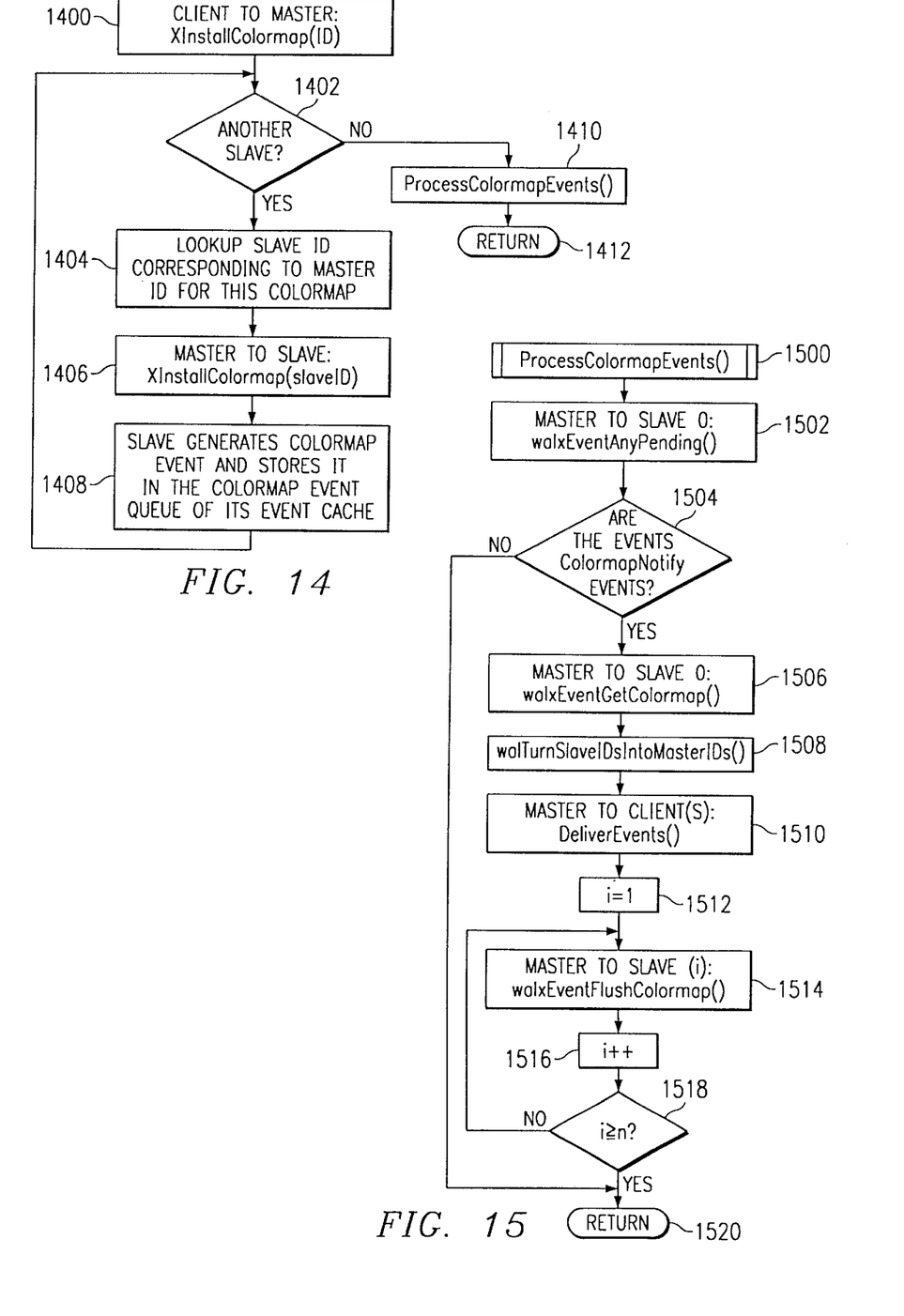
FIGS. 14–15 are flow diagrams illustrating a preferred method for colormap event caching and colormap event handling within the configuration of FIG. 3.

In the case of expose events, information is needed from each slave in order to form a properly coalesced master event that can be transmitted to the client. In the case of colormap events, however, the situation is simpler. For each colormap resource in the master, a set of slave colormap IDs will be associated with it. But if a colormap event occurs in the slaves, the corresponding colormap ID from any one slave will be sufficient to determine the corresponding master colormap ID for transmitting to the client. FIGS. 14 and 15 illustrate this in more detail.

In FIG. 14, assume that colormaps have been created in master 310 and that, for each colormap in the master, a corresponding colormap has been created in each of slaves 312–318. Then, at step 1400, assume client 110 sends a protocol request to master 310 to install one of the existing colormaps. In steps, 1402–1408, master 310 loops through each slave installing the corresponding colormaps. In step 1404, master 310 determines the slave colormap ID that corresponds to the master colormap ID. In step 1406, master 310 issues an XInstallColormap request to the slave, using the proper slave ID for the colomap. Then, in step 1408, the slave generates a colormap event because its colormap will have been changed. It stores this event in the colormap event queue of its event cache. Once this process has been completed for each slave, master 310 will preform a ProcessColormapEvents( ) routine in step 1410.

FIG. 15 illustrates the ProcessColormapEvents( ) routine in more detail. In step 1502, master 310 interrogates slave 312 with a walxEventAnyPending( ) request. In response, slave 312 transmits the above-discussed mask to master 310. In step 1504, master 310 parses the mask to determine if there are any colormap events pending in slave 312. If not, the routine returns at step 1520. But if so, in step 1506 master 310 retrieves all of the colormap events from slave 312's colormap event queue by issuing the walxEventGetColormap( ) request to slave 312. (As in the expose events case, the walxEventGetColormap( ) request has the effect of clearing the colormap event queue in that slave.) In step 1508, master 310 determines which master colormap ID corresponds to the slave colormap ID for each colomap expose event. In step 1510, master 310 delivers the expose events to client 110 (including any other interested clients), using the proper master colormap IDs. Then, in steps 1512–1518, master 310 issues a walxEventFlushColormap( ) request to each of slaves 314–318 in order to clear the colormap event queues in each of those slaves.

2.2.2 Reclamation of Protocol-Level Parameters for DIX/DDX Interface Entrypoints Another problem the inventors have solved uniquely relates to implementing certain DIX/DDX interface entrypoints with protocol. As discussed above, the inventors chose to implement certain DIX/DDX entrypoints as protocol requests. For example, the DIX/DDX entrypoint "CreateGC" has been turned into a series of XCreateGC( ) calls to each of the slave servers. This was done because, in the configuration of FIG. 3, there is no actual DDX layer in master 310; but the DIX layer of master 310 needs to be able to access DDX-layer functionality within each of slaves 312–318. The problem with doing this, however, is that once an X protocol-level request gets to the DIX/DDX interface level, it has changed from its original form. For example, XCreateGC( ) requires a "drawable" as one of its arguments. But once the request gets to the DIX/DDX interface, the drawable parameter has been removed from the parameter list. To construct the correct X protocol-level call, then, for each of the slaves, master 310 frequently must do extra work to "reclaim" the missing information.

2.2.2.1 Create Window Example

In some cases, it is possible to reconstruct the X protocol-level information and to create an appropriate X protocol request between master 310 and each of slaves 312–318. An example of this case is XCreateWindow. Table 2 illustrates how this X protocol request may be reconstructed at the DIX/WAL level within master 310 and sent to the slaves as a group of related X protocol requests.

TABLE 2

| Request/Procedure/Function/Routine | Process | Level |
|---|---|---|
| From client 110 to master 310: | | |
| XCreateWindow(masterhost:0,100,50,2000,1400) | Client 110 | Xlib |
| ProcCreateWindow(100,50,2000,1400) | Master 310 | DIX |
| CreateWindow(100,50,2000,1400) | Master 310 | DIX |
| walCreateWindow(100,50,2000,1400 | Master 310 | WAL |
| From master 310 to slave 312: | | |
| XCreateWindow(slave312host:0,100,50,2000,1400) | Master 310 | WAL |
| ProcCreateWindow(100,50,2000,1400) | Slave 312 | DIX |
| CreateWindow(100,50,2000,1400) | Slave 312 | DIX |
| suCreateWindow(100,50,2000,1400) | Slave 312 | DDX |
| From master 310 to slave 314: | | |
| XCreateWindow(slave314host:0,−1180,50,2000,1400) | Master 310 | WAL |
| ProcCreateWindow(−1180,50,2000,1400) | Slave 314 | DIX |
| CreateWindow(−1180,50,2000,1400) | Slave 314 | DIX |
| suCreateWindow(−1180,50,2000,1400) | Slave 314 | DDX |
| From master 310 to slave 316: | | |
| XCreateWindow(slave316host:0,100,−974,2000,1400) | Master 310 | WAL |
| ProcCreateWindow(100,−974,2000,1400) | Slave 316 | DIX |
| CreateWindow(100,−974,2000,1400) | Slave 316 | DIX |
| suCreateWindow(100,−974,2000,1400) | Slave 316 | DDX |
| From master 310 to slave 318: | | |
| XCreateWindow(slave318host:0,−1180,−974,2000,1400) | Master 310 | WAL |
| ProcCreateWindow(−1180,−974,2000,1400) | Slave 318 | DIX |
| CreateWindow(−1180,−974,2000,1400) | Slave 318 | DIX |
| suCreateWindow(−1180,−974,2000,1400) | Slave 318 | DDX |
| miCreateWindow(100,50,2000,1400) | Master 310 | WAL |

2.2.2.2 Create Cursor Example

In other cases, not all X protocol-level parameters are present at the DIX/DDX level. In those cases, walx extension protocol may be used to pass the missing information to the slaves.

Cursor creation illustrates this point. Ordinarily during cursor creation, the DDX layer expects to be able to use pointers to access a cursor data bitmap and a cursor mask bitmap stored in a DIX-layer data structure. But in the configuration of FIG. 3, this would not be possible because the slave DDX layer does not reside on the same server (or in the same process) as the master's DIX layer data structures. Therefore, a walxCreateCursor command is used to pass the cursor data and cursor mask to the slaves.

Figure 16:
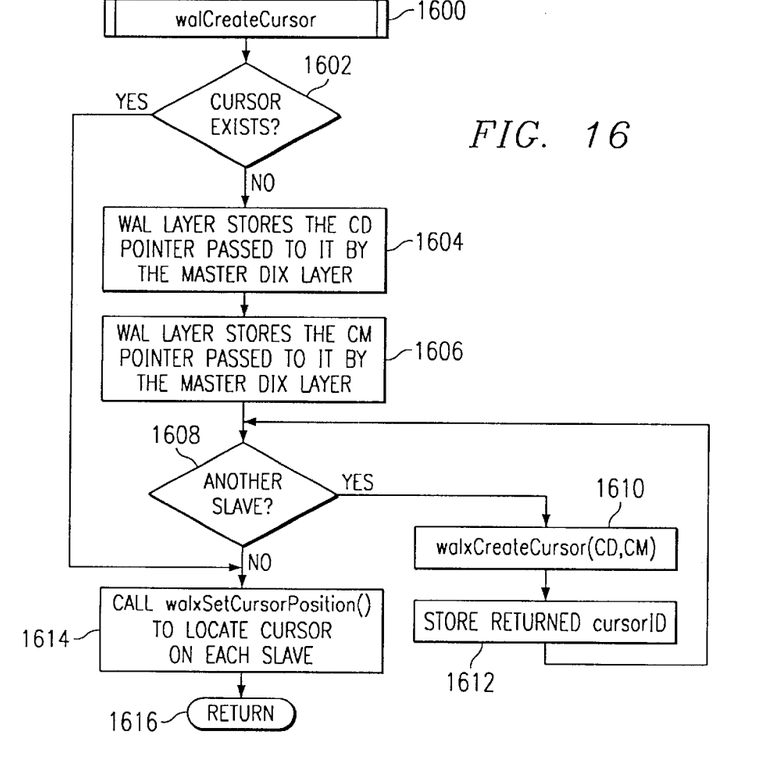
FIGS. 16–17 are flow diagrams illustrating a preferred method for enabling DIX/DDX interface functions to be performed between the DIX layer of the master server of FIG. 3 and the DDX layer of one of the slave servers of FIG. 3.

FIG. 16 illustrates the routine performed within master 310 during cursor creation. If it is determined in step 1602 that the cursor already exists, then master 310 simply uses the walxSetCursorPosition( ) request with each of the slaves in step 1614 to locate the cursor appropriately on the logical screen. (See the above discussion on cursor positioning.) But if it is determined in step 1602 that the cursor does not yet exist, then in step 1604 master 310 saves the cursor data bitmap pointer that was passed to it by DIX layer 338. Similarly, in step 1606, master 310 saves the cursor mask bitmap pointer that was passed to it by DIX layer 338. In steps 1608–1612, master 310 loops through the slaves issuing the walxCreateCursor command (step 1610), saving the returned cursorIDs for each slave, and associating them with the master's cursor ID (step 1612). Each time master 310 performs step 1610, it uses the pointers saved during steps 1604 and 1606 to access the cursor data bitmap and cursor mask bitmap in DIX layer 338, and it sends the cursor data bitmap ("CD") and the cursor mask bitmap ("CM") to the slave.

Figure 17:
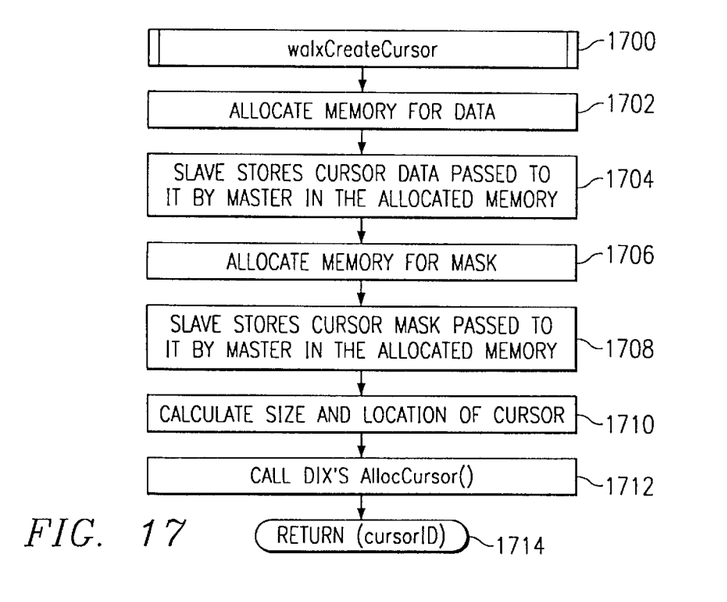

FIG. 17 illustrates in detail the routine performed by each slave in response to the walxCreateCursor request. In step 1702, the slave allocates memory for the cursor data bitmap. In step 1704, the slave copies the cursor data bitmap passed to it by master 310 into the memory allocated in step 1702. In step 1706, the slave allocates memory for the cursor mask bitmap. In step 1708, the slave copies the cursor mask bitmap passed to it by master 310 into the memory allocated in step 1706. In step 1710, the slave calculates the size and location of the cursor. In step 1712, the slave calls its DIX routine AllocCursor( ). Finally, in step 1714, the slave returns a cursor ID to master 310.

While the invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that will remain within the scope of the appended claims. For example, master server process 310 may run on the same host as client process 110, while each of slave server processes 312–318 run on different hosts.

What is claimed is:

1. A single logical screen computer display system, comprising:

a client process;

a master server process, said master server process having a network connection to said client process; and first and second slave server host computers, said first and second slave server host computers having first and second slave server processes running therein, respectively, said first and second slave server processes each having a network connection to said master server process, and said first and second slave server processes controlling first and second display hardware, respectively, said first and second display hardware having first and second display resolutions, respectively;

wherein said client process is operable to issue logical screen window system requests to said master server process, said logical screen window system requests directed to a single logical screen having a logical screen resolution that is higher than either of said first and second display resolutions; and wherein said master server process is operable to issue physical screen window system requests to said first and second slave server processes responsive to said logical screen window system requests, said physical screen window system requests for causing said first and second display hardware to display said single logical screen.

2. A single logical screen computer display system according to claim 1, wherein:

said client process is operable to use X protocol to issue said logical screen window system requests to said master server process; and said master server process is operable to use both X protocol and an extension protocol to issue said physical screen window system requests to said first and second slave server processes.

3. A single logical screen computer display system according to claim 2, wherein:

said master server process includes an X server DIX layer;

said first and second server processes include first and second X server DDX layers, respectively; and at least one request defined by said extension protocol allows an X server DIX/DDX interface function to be performed between said X server DIX layer in said master server process and said first X server DDX layer in said first slave server process, using said network connection between said master server process and said first slave server process.

4. A modified X Window System server software product stored on computer-readable media and operable, when executed on a computer, to perform method steps comprising:

a) responsive to configuration information, establishing a mode of operation chosen from the group consisting of: master server mode and slave server mode;

b) if said mode of operation established in step a) is said master server mode:

b1) receiving logical screen window system requests from an X client server process, said logical screen window system requests directed to a single logical screen; and b2) issuing physical screen window system requests to first and second slave server processes responsive to said logical screen window system requests, said physical screen window system requests for causing said first and second slave server processes to display said single logical screen on first and second display hardware; and c) if said mode of operation established in step a) is said slave server mode:

c1) receiving physical screen window system requests from a master server process; and c2) controlling slave display hardware responsive to said physical screen window system requests.

5. A single logical screen computer display system, comprising:

a client process;

a master server process; and first and second slave server processes operable to control first and second displays, respectively, each of the slave server processes having a device-dependent layer;

wherein the client process communicates with the master server process as though the master server process controlled a single display;

wherein the master server process issues physical screen window system requests to the first and second slave server processes by calling functions within the device-dependent layers of the slave server processes so that the first and second displays cooperatively produce the single display;

wherein the client process communicates with the master server process using X protocol;

wherein the WAL layer presents the appearance of a conventional DDX layer to the DIX layer, but is also operable to communicate with the first and second slave servers using an extension protocol; and wherein the first and second slave server processes each comprise a conventional X server process and a walX extension, the walX extension enabling the first and second slave server processes to use the extension protocol.

6. The system of claim 5, wherein:

the WAL layer, the extension protocol and the WalX extension enable the DIX layer of the master server process to access DDX-layer functions in each of the first and second slaver server processes.

7. A single logical screen computer display system, comprising:

a client process;

a master server process; and first and second slave server processes operable to control first and second displays, respectively;

wherein the client process communicates with the master server process as though the master server process controlled a single display;

wherein the master server process issues physical screen window system requests via network connections to the first and second slave server processes so that the first and second displays cooperatively produce the single display; and wherein the master server process comprises a conventional DIX layer but comprises a WAL layer in lieu of a conventional DDX layer.

8. The system of claim 7:

wherein the WAL layer presents the appearance of a conventional DDX layer to the DIX layer, but is also operable to communicate with the first and second slave servers using an extension protocol.

9. The system of claim 8:

wherein the first and second slave server processes each comprise a conventional X server process and a walX extension, the walX extension enabling the first and second slave server processes to use the extension protocol.

10. The system of claim 9:

wherein the WAL layer, the extension protocol and the walX extension enable the DIX layer of the master server process to access DDX-layer functions in each of the first and second slaver server processes.

* * * * *